United States Patent
Muchherla et al.

(10) Patent No.: US 11,416,388 B2
(45) Date of Patent: Aug. 16, 2022

(54) MEMORY SUB-SYSTEM LOGICAL BLOCK ADDRESS REMAPPING

(71) Applicant: Micron Technology, Inc., Boise, ID (US)

(72) Inventors: Kishore K. Muchherla, Fremont, CA (US); Vamsi Pavan Rayaprolu, San Jose, CA (US); Karl D. Schuh, Santa Cruz, CA (US); Jiangang Wu, Milpitas, CA (US); Gil Golov, Backnang (DE)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/027,895

(22) Filed: Sep. 22, 2020

(65) Prior Publication Data

US 2022/0091975 A1    Mar. 24, 2022

(51) Int. Cl.
*G06F 12/02* (2006.01)
*G06F 12/0882* (2016.01)
*G06F 12/0873* (2016.01)
*G06F 11/30* (2006.01)
*G06F 12/0811* (2016.01)

(52) U.S. Cl.
CPC ...... *G06F 12/0246* (2013.01); *G06F 11/3037* (2013.01); *G06F 12/0811* (2013.01); *G06F 12/0873* (2013.01); *G06F 12/0882* (2013.01); *G06F 2212/7201* (2013.01)

(58) Field of Classification Search
CPC ............ G06F 12/0246; G06F 12/0811; G06F 11/3037; G06F 2212/7201; G06F 12/0882; G06F 12/0873
USPC ........................................................ 711/154
See application file for complete search history.

(56) References Cited

U.S. PATENT DOCUMENTS

| | | | |
|---|---|---|---|
| 5,822,142 A | 10/1998 | Hicken | |
| 6,795,264 B2 | 9/2004 | Wilson | |
| 6,912,619 B2 | 6/2005 | Suzuki | |
| 8,849,104 B2 | 9/2014 | Eder | |
| 10,274,948 B2 | 4/2019 | Penilla et al. | |
| 10,606,760 B2 * | 3/2020 | Erez | G06F 12/0246 |
| 10,629,238 B1 * | 4/2020 | Buch | G11B 21/02 |
| 2014/0215125 A1 * | 7/2014 | Sela | G06F 3/0652 711/103 |
| 2017/0372431 A1 | 12/2017 | Perl | |

* cited by examiner

*Primary Examiner* — Hua J Song
(74) *Attorney, Agent, or Firm* — Brooks, Cameron & Huebsch, PLLC

(57) ABSTRACT

A system includes a memory device and a processing device coupled to the memory device. The processing device can determine a data rate from a first sensor and a data rate from a second sensor. The processing device can write a first set of data received from the first sensor at a first logical block address (LBA) in the memory device. The processing device can write a second set of data received from the second sensor and subsequent to the first set of data at a second LBA in the memory device. The processing device can remap the first LBA and the second LBA to be logically sequential LBAs. The second LBA can be associated with an offset from the first LBA and the offset can correspond to a data rate of the first sensor.

21 Claims, 8 Drawing Sheets

MEMORY SUB-SYSTEM LOGICAL BLOCK ADDRESS REMAPPING

TECHNICAL FIELD

Embodiments of the disclosure relate generally to memory sub-systems, and more specifically, relate to memory sub-system logical block address remapping.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
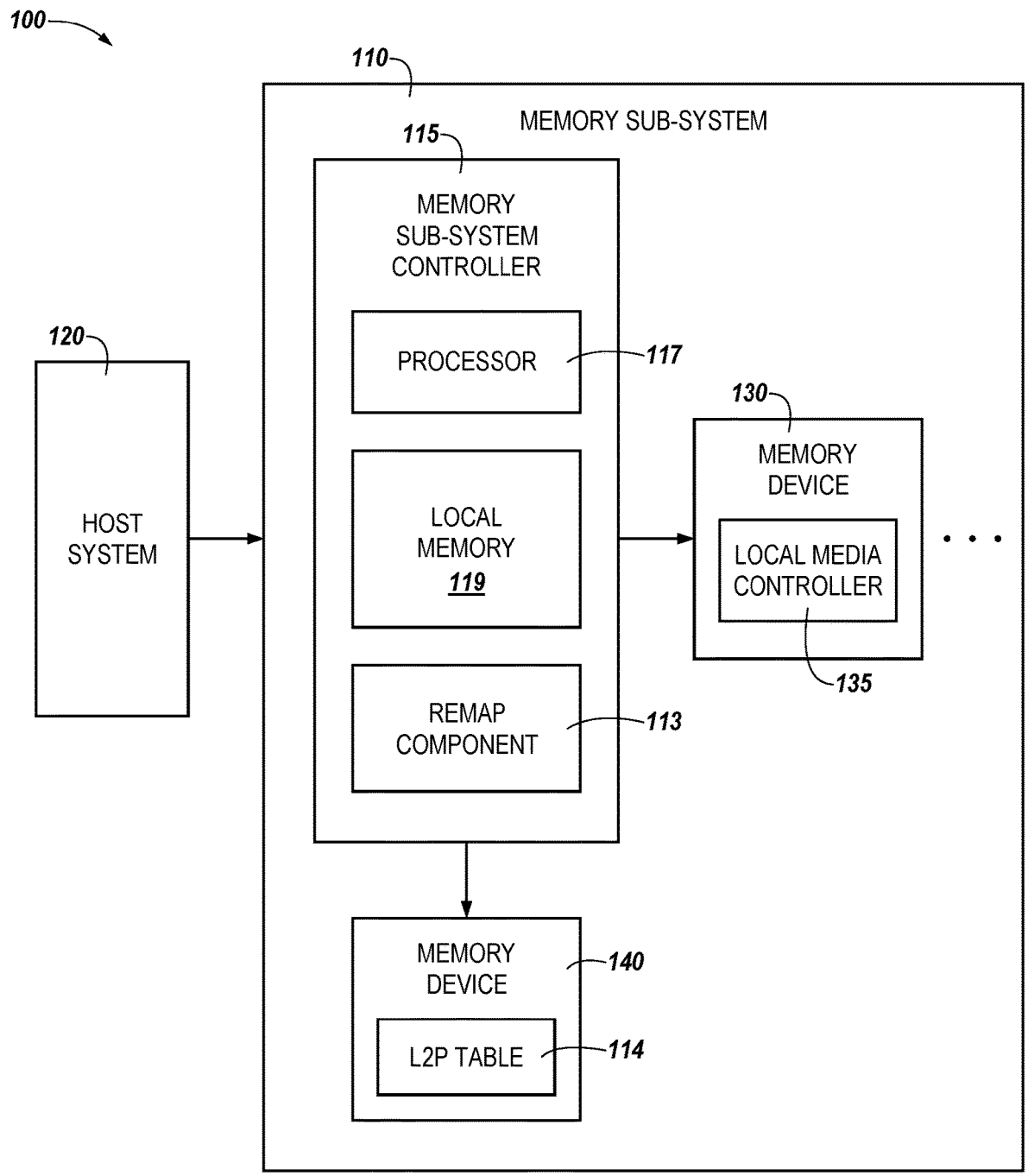
FIG. 1 illustrates an example computing system that includes a memory sub-system in accordance with some embodiments of the present disclosure.

Aspects of the present disclosure are directed to memory logical block address remapping associated with a memory sub-system, in particular to memory sub-systems that include a remap component. A memory sub-system can be a storage device, a memory module, or a hybrid of a storage device and memory module. An example of a memory sub-system is a storage system, such as a solid state drive (SDD). Examples of storage devices and memory modules are described below in conjunction with FIG. 1. In general, a host system can utilize a memory sub-system that includes one or more components, such as "memory devices" that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

An SSD is a type of memory sub-system that uses integrated circuit assemblies to store data persistently, typically using flash memory. An SSD can include memory devices that include one or more arrays of memory cells. The performance, endurance, and/or retention of an SSD can be related to the type(s) of memory cells employed by the SSD. In general, as the quantity of bits stored per cell increases, the sensitivity of retention (the ability to maintain stored data integrity over a specified length of time) of the memory cell to fluctuations in temperature tends to increase. A retention failure can lead to errors and can cause events that are performed by the SSD to fail or not occur correctly. Temperature fluctuations can occur for extended periods of time during transportation of an SSD post-manufacturing. As an example, memory cells storing data in a single-level cell (SLC) mode can be less susceptible to damage due to high temperature fluctuations than a memory cell storing data in a non-SLC (e.g., multi-(MLC), tri-(TLC), or quad-(QLC), penta-(PLC) level cell mode).

A flash memory device can include a flash transition layer (FTL) that can be used (e.g., during a programming operation performed on the flash memory device) to map logical addresses to physical addresses in the flash memory (e.g., via a logical to physical (L2P) table). As an example, in some previous approaches, an entry in a logical to physical (L2P) address mapping table can include a reference to a die, block, plane, and page of memory that a portion of data is stored in. Further, a die can include a number of planes, the number of planes can each include a number of blocks, and the number of blocks can each include a number of pages.

However, the size of (e.g., the amount of data stored in) address mapping tables can become very large as the size of the memory (e.g., non-volatile storage array, NAND) to be mapped becomes larger or larger portions of the memory are stored for accessing a particular physical location in the memory. Main memory (such as in DRAM) can be expensive and space can be limited. As in previous approaches, a fixed, large address mapping table can be difficult to fit into an already limited amount of memory (e.g., non-volatile storage array, NAND) space. The larger the address mapping table, the more difficult it can be to fit a portion of the address mapping table into a cache without affecting a cache hit rate. Further, as the size of memory mapped by the FTL increases, the size of the address mapping table can increase to a size that becomes difficult to manage. Further, in the instance where an L2P table is stored in an SLC mode, an amount of times the L2P table is accessed can affect performance of the memory cells storing the L2P table.

By limiting a size of data used for the L2P table, or a size of an L2P table entry, the SLC memory cells storing the L2P table can have improved endurance over a period of time of use. Further, the L2P table can be smaller, thereby using less memory space for the L2P table. In addition, the L2P table can be reconstructed in a shorter amount of time and with less processing resources. As memory drives continue to increase in size, a method to reduce the size of an address mapping table can allow for larger memory drive sizes without a corresponding increase in the address mapping table used to map a logical address to a physical address. In this way, physical memory space used for storing address mapping tables can be minimized and the scalability of the address mapping tables can be increased. Further, limiting storage of the data to an SLC mode can provide a more beneficial experience. For example, memory cells in an SLC mode can be accessed and written to faster and thereby provide an improved user experience.

Aspects of the present disclosure address the above and other deficiencies by storing data received from sensors in a particular way in order to minimize the size of an L2P table used to map the received data from logical to physical locations in the memory. For example, logical block addresses (LBAs) associated with data received from each sensor can be sequential and include an offset from a first set of data received based on a data rate of each of the sensors. In this way, the offsets can be determined based on which sensor sent the data and how much data over a period of time is sent. In this way, accessing the received data is simplified and a decrease in the amount of data used in the L2P table can be achieved. An advantage of the present disclosure includes minimizing a size and a quantity of accesses of the L2P table. Embodiments described herein include a remap component resident on the memory sub-system (e.g., on the memory sub-system controller), to make it possible to control storage of the LBAs by remapping the LBAs received by the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAIVI), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a remap component 113 that can be configured to orchestrate and/or perform operations to store data from different sensors in different LBAs and can use various components, data paths, and/or interfaces of the memory sub-system 110 to do so. The remap component 113 can include various circuitry to facilitate control of the storage of data in the memory cells and its corresponding LBA in a logical to physical (L2P) table. For example, the remap component 113 can include a special purpose circuitry in the form of an ASIC, FPGA, state machine, and/or other logic circuitry or software and/or firmware that can allow the remap component 113 to orchestrate and/or perform data storage operations and communicate to various components, data paths, and/or interfaces of the memory sub-system 110.

The remap component 113 can be communicatively coupled to the memory devices 130, 140 and can access the memory device 130, the memory device 140, internal data paths of the memory sub-system 110, and/or interfaces of the memory sub-system 110 to perform the operations described herein and/or to transfer storage data to additional elements of the memory sub-system 110. In some embodiments, the operations performed by the remap component 113 can be performed during an initialization or pre-initialization stage of data transfer within the memory sub-system 110 and/or the memory sub-system controller 115. Accordingly, in some embodiments, the remap component 113 can perform the operations described herein prior to data transfer in order to determine a mode that data is stored in, which can affect subsequent data transfer speeds of the data out of the cells storing in that particular mode.

In some embodiments, the memory sub-system controller 115 includes at least a portion of the remap component 113. For example, the memory sub-system controller 115 can include a processor 117 (processing device) configured to execute instructions stored in local memory 119 for performing the operations described herein. In some embodiments, the remap component 113 is part of the host system 110, an application, or an operating system.

The memory devices 130, 140 in FIG. 1 can include a number of physical blocks in accordance with some embodiments of the present disclosure. For example, the memory devices 130, 140 can include a NAND flash memory array including the number of physical blocks. However, embodiments of the present disclosure are not limited to a particular type of memory or memory array. For example, the memory array can be a DRAM array, an RRAM array, or a PCRAM array, among other types of memory arrays. Further, the memory array can be located on a particular semiconductor die along with various peripheral circuitry associated with the operation thereof.

The memory cells of the memory array can be mixed mode cells operable as SLCs and/or XLCs (e.g., extra-level cells which can refer to cells operable at a level greater than SLCs). The number of physical blocks in the memory array can be 128 blocks, 512 blocks, or 1,024 blocks, but embodiments are not limited to a particular multiple of 128 or to any particular number of physical blocks in memory array. Further, different portions of memory can serve as a dynamic SLC cache for garbage collection purposes. For example, different portions of memory can be dynamically increased and/or decreased in size as demands on the memory are increased and/or decreased and garbage collection more efficiently address these demands.

Each physical block of the memory array can contain a number of physical rows of memory cells coupled to access lines (e.g., word lines). The number of rows (e.g., word lines) in each physical block can be 32, but embodiments are not limited to a particular number of rows per physical block. Further, the memory cells can be coupled to sense lines (e.g., data lines and/or digit lines).

Each row can include a number of pages of memory cells (e.g., physical pages). A physical page refers to a unit of programming and/or sensing (e.g., a number of memory cells that are programmed and/or sensed together as a functional group). Each row can comprise one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including XLCs, a physical page of memory cells can store multiple pages (e.g., logical pages) of data, for example, an upper page of data and a lower page of data, with each cell in a physical page storing one or more bits towards an upper page of data and one or more bits towards a lower page of data.

In a non-limiting example, an apparatus (e.g., the computing system 100) can include a memory sub-system remap component 113. The memory sub-system remap component 113 can be resident on the memory sub-system 110. As used herein, the term "resident on" refers to something that is physically located on a particular component. For example, the memory sub-system remap component 113 being "resident on" the memory sub-system 110 refers to a condition in which the hardware circuitry that comprises the memory sub-system remap component 113 is physically located on the memory sub-system 110. The term "resident on" can be used interchangeably with other terms such as "deployed on" or "located on," as referred to herein.

The memory sub-system remap component 113 can be configured to determine a data rate from each of a number of sensors. As used herein, a data rate can refer to a quantity of data that is received per a period of time. For example, a data rate can include 1 gigabyte (GB)/second (sec), 0.5 GB/sec, 0.25 GB/sec, etc. The memory sub-system remap component 113 can determine to store a first set of data received from a first sensor at a first logical block address (LBA) in the memory sub-system. An entry indicating a starting point of the first LBA can be entered into a logical to physical (L2P) table 114 stored within the memory device 140 (or in some embodiments, in memory device 130). The memory sub-system remap component 113 can determine to store a second set of data received from the second sensor and subsequent to the first set of data at a second LBA in the memory device. The second LBA is logically sequential with the first LBA. An offset can indicate how far data-wise a starting point of the second LBA is from the starting point of the first LBA (e.g, from a location indicated by the entry in the L2P table 114). The offset can be based on the data rate of the first sensor (e.g., the data width of the first set of data associated with the first LBA). The memory sub-system remap component 113 can determine to store a third set of data received from the first sensor at a third LBA in the memory device. The third LBA is logically consecutive with the second LBA. An offset associated with the third LBA can determine a starting point of the third LBA from a starting point of the first LBA (e.g., from a location indicated by the entry in the L2P table 114). The offset associated with the third LBA can be based on a data rate of the first sensor (e.g., an amount of data in the first data set) and a data rate of the second sensor (e.g., an amount of data in the second data set). That is, the offset can include adding the data width of the first data set and a data width of the second data set in order to determine a total data width from the starting point of the first data set and a starting point of the third data set.

The memory sub-system remap component 113 can be further configured to determine to store a fourth set of data received from the second sensor at a fourth LBA in the memory device. The fourth LBA is logically consecutive with the third LBA. An offset associated with the fourth LBA can determine a starting point (e.g., physical location) of the fourth LBA from a starting point of the first LBA (e.g., from a location indicated by the entry in the L2P table 114). The offset associated with the fourth LBA can be based on a data rate of the first sensor (e.g., an amount of data in the first data set) and a data rate of the second sensor (e.g., an amount of data in the second data set). That is, the offset can include adding the data width of the first data set and the second data set along with adding a data width of the second data set in order to determine a total data width from the starting point of the first data set and a starting point of the fourth data set. While two sensors are described and illustrated in this example, embodiments are not so limited. For example, data can be received from three sensors and three data rates can be used. In addition, four sensors, five sensors, etc. can send data and four data rates, five data rates, etc. can be used.

Figure 2A:
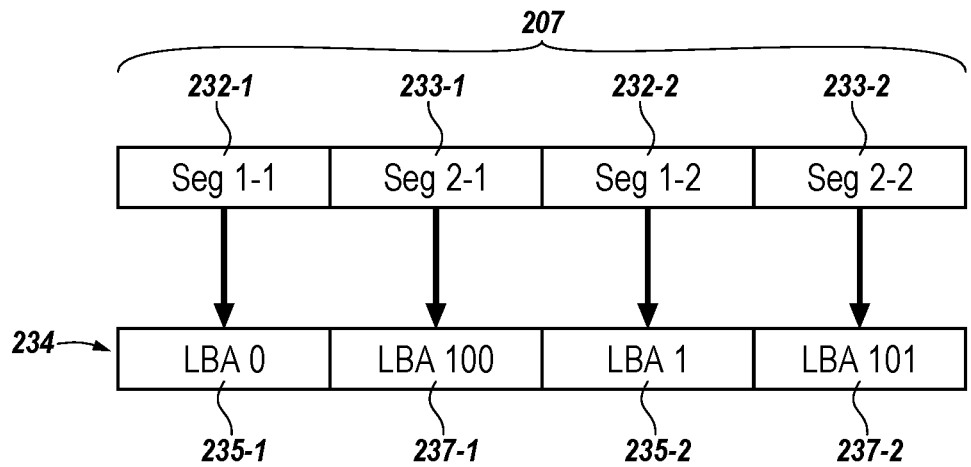
FIG. 2A illustrates an example of writing data from multiple sensors without remapping logical block addresses in accordance with some embodiments of the present disclosure.

FIG. 2A illustrates an example of writing data from multiple sensors without remapping logical block addresses in accordance with some embodiments of the present disclosure. A memory sub-system controller, such as the memory sub-system controller 115, can received data 207 in a particular order from one or more sensors. As an example, and as illustrated in FIG. 2A, a first data segment 232-1 can be received first, a second data segment 233-1 can be received second, a third data segment 232-2 can be received third, and a fourth data segment 233-2 can be received fourth. The first and third data segments 232-1, 232-2 can be received from a particular sensor. The second and fourth data segments 233-1, 233-2 can be received from a different sensor. For purposes of labeling in FIG. 2A, the data segments are labeled such that a first digit is associated with a sensor that sent the data segment and the second digit is associated with an order of the data segment from that sensor. For example, segment 1-1 (e.g., Seg 1-1 232-1) is from a first sensor (e.g., "1"-1) and is a first-ordered data segment (e.g., 1-"1") from that first sensor.

The data segments 232-1, 233-1, 232-2, 233-2 can be stored at a number of logical block addresses (LBAs). For example, data segment 1-1 232-1 can be received first from the first sensor. The data segment 1-1 232-1 (e.g., a first data segment) can be stored as a first LBA (e.g., "LBA 0") 235-1 As data segment 2-1 (e.g., "Seg 2-1") 233-1 (e.g., second data segment) was received second, data segment 2-1 233-1 is stored as a second LBA ("LBA 100") 237-1. Since data segment 2-1 233-1 is stored as non-sequential with the first data segment (e.g., LBA 0 is not sequential with LBA 100), separate entries in an L2P table will be used to identify the location of each of the first data segment and the second data segment. Likewise, as data segment 1-2 ("Seg 1-2") 232-3 was received third, the data segment 1-2 232-2 is stored as a third LBA ("LBA 1") 235-2. The third data segment is stored as non-sequential with the second data segment (e.g., LBA 1 is not sequential with LBA 100), separate entries in an L2P table will be used to identify the location of each of data segment 1-2 232-2 and data segment 2-1 233-1. Further, separate entries in the L2P table will be used to identify the location of data segment 2-2 233-2, as well. In this way, the LBA location to store the received data sets from different sensors can be stored non-sequential logically and will each be associated with a separate entry in an L2P table to locate the physical location of the data sets in a memory device. A data segment being sequential can refer to a data segment being next to or together in sequence with another data segment.

Figure 2B:
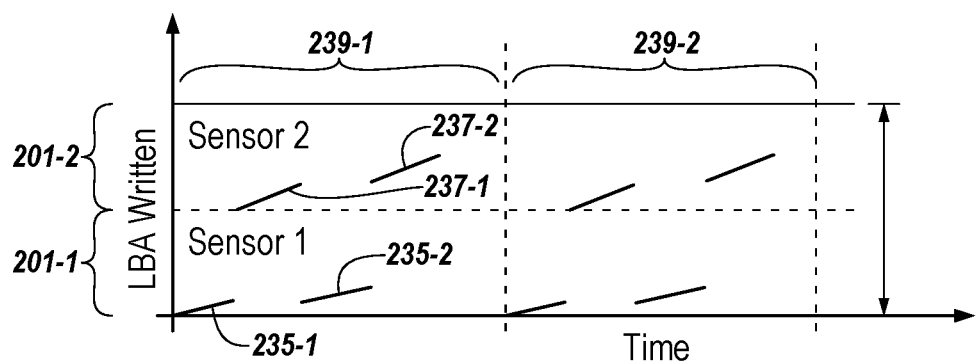
FIG. 2B illustrates an example diagram showing data associated with particular sensors being written in a memory device in accordance with some embodiments of the present disclosure.

FIG. 2B illustrates an example diagram showing data associated with particular sensors being written in a memory device in accordance with some embodiments of the present disclosure. The diagram of FIG. 2B is associated with the data segments received in the description of FIG. 2A. As is illustrated in FIG. 2B, an x-axis of the diagram illustrates a period of time and the y-axis illustrates a first LBA 201-1 and a second LBA 201-2 that the data segments are written to. For example, a first data segment associated with LBA 0 235-1 is received first in time, a second data segment associated with LBA 100 237-1 is received second, a third data segment associated with LBA 1 235-2 is received third, and a fourth data segment associated with LBA 101 237-2 is received fourth. The data segments associated with the first LBA 201-1 are received from a first sensor and the data segments associated with the second LBA 201-2 are received from a second sensor. In this way, the data segments received from the first sensor are logically sequential in the first LBA 201-1 and the data segments received from the second sensor are logically sequential in the second LBA 201-2. However, data segments received in real time are not sequential, such as those associated with LBA 0 235-1 and LBA 100 237-1, which are received consecutively in time but are non-sequential logically. Due to this, a separate entry for each of the LBAs 201-1, 201-2 can be entered into an L2P table in order to locate the starting physical address of the respective data segments.

In some embodiments, data received from the sensors and written to the LBAs 201-1, 201-2 can be received during a first period of time 239-1. At the conclusion of writing to the LBAs 201-1, 201-2, the data that is subsequently received can be written to a beginning of LBA 201-1, and the data previously written as LBA 201-1 can be overwritten and/or previously erased. This can be repeated during time period 239-2 and for additional time periods until a message is received from a host to switch to a different location in the memory device or an error occurs.

Figure 3A:
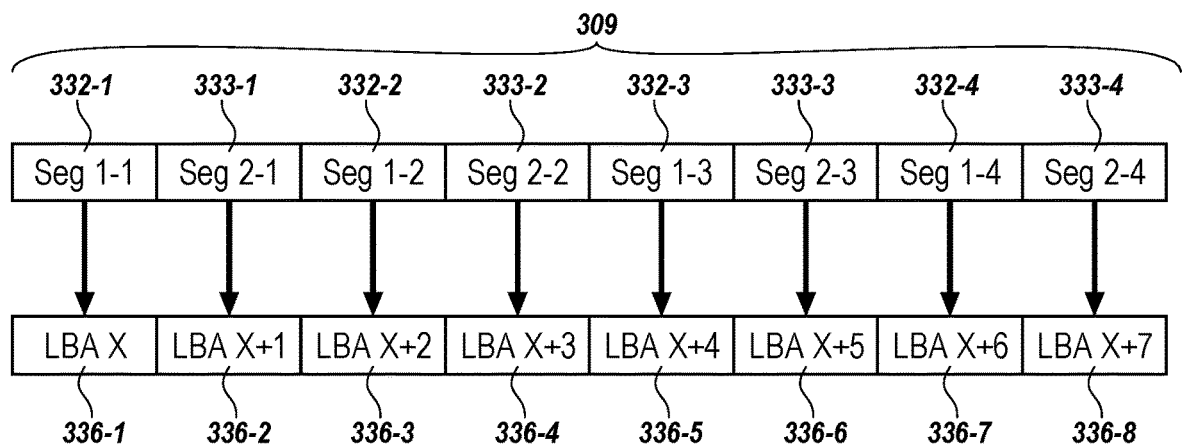
FIG. 3A illustrates an example of writing data from multiple sensors by remapping logical block addresses in accordance with some embodiments of the present disclosure.

FIG. 3A illustrates an example of writing data from multiple sensors by remapping logical block addresses in accordance with some embodiments of the present disclosure. A memory sub-system controller, such as the memory sub-system controller 115, can received data 309 in a particular order from one or more sensors. As an example, and as illustrated in FIG. 3A, a first data segment 332-1 can be received first, a second data segment 333-1 can be received second, a third data segment 332-2 can be received third, a fourth data segment 333-2 can be received fourth, and so forth for data segments 332-3, 333-3, 332-4, and 333-4. The first, third, fifth, and seventh data segments 332-1, 332-2, 332-3, 332-4 can be received from a particular sensor. The second, fourth, sixth, and eighth data segments 333-1, 333-2, 333-3, and 333-4 can be received from a different sensor. For purposes of labeling in FIG. 3A, the data segments are labeled such that a first digit is associated with a sensor that sent the data segment and the second digit is associated with an order of the data segment from that sensor. For example, segment 1-1 (e.g., Seg 1-1 332-1) is from a first sensor (e.g., "1"-1) and is a first-ordered data segment (e.g., 1-"1") from that first sensor.

A remap component (such as the remap component 113 in FIG. 1) can determine which LBA locations to store the first through eighth data segments 332, 333 in a memory device (such as the memory device 130 in FIG. 1). For example, data segment 1-1 332-1 can be received first from the first sensor. The remap component 113 can determine to store data segment 1-1 332-1 (e.g., a first data segment) as a first LBA (e.g., "LBA X") 336-1. As data segment 2-1 (e.g., "Seg 2-1") 333-1 was received second, data segment 2-1 333-1 is stored as a second LBA ("LBA X−1") 336-2. Since data segment 2-1 333-1 is stored as logically sequential with the first data segment (e.g., LBA X is sequential with LBA X+1), a single entry in an L2P table will be used to identify the location of each of the first data segment and the second data segment where the second data segment can be identified with an offset.

An offset can be determined based on a data rate of a particular sensor. The remap component (e.g., remap component 113) can determine a size of a data segment associated with an LBA portion and/or how many LBA portions to allocate to each sensor based on a determination of a data rate for that sensor. As an example, the first sensor can send data at a rate of 10 megabytes (MB) per millisecond (msec) and the second sensor can send data at a rate of 100 megabytes per msec. In this instance, the LBA size allocated to the second sensor can be ten times the size allocated to the first sensor. This is how, without remapping the data segments, the memory device can determine where to break the LBA portions illustrated in FIG. 2A-2B, and therefore store the second data segment received in the second LBA. However, in the example of FIG. 3A here, the data segments are remapped and the data rate can be used to determine an offset, thereby decreasing an amount of entries in an L2P table. For example, the remap component 113 can use the starting location from the entry of data segment 1-1 332-1 in order to determine an offset for data segment 1-1 333-1. This offset can be based on a data rate of the first sensor, or put another way, the amount of data from data segment 1-1 332-1 received from the first sensor.

Likewise, as data segment 2-2 ("Seg 1-2") 332-3 was received third, the data segment 1-2 332-2 is stored as a third LBA ("LBA X+2") 336-3. The third data segment 1-2 332-2 is stored as sequential with the second data segment (e.g., LBA X+2 is sequential with LBA X+1), and each of these entries can use an offset from a starting location of the first data segment 1-1 332-1. Likewise, the fourth, fifth, sixth, seventh, and eighth received data segments 332-3, 333-3, 332-4, 333-4, are each stored logically sequential as LBAs X+4 336-5, X+5 336-6, X+6 336-7, and X+7 336-8, respectively. Each of these LBAs can use an offset from the starting location of LBA X 336-1 whereby a single entry in the L2P table can be used instead of more than one entry.

For example, the fifth data segment 1-3 332-3 can use a data rate from a first sensor (which sent data segments 1-1 332-1, and 1-2 332-2 prior to sending the fifth data segment 1-3 332-3) and a second sensor (which sent data segments 2-1 333-1 and 2-2 333-2 prior to reception of the fifth data segment 1-3 332-3). Using these data rates that indicate a data width for each data segment from each sensor, the data width corresponding to the data rate can be added together. As an example, if the first sensor sends 10 MB of data for each data segment based on the data rate and the second sensor sends 100 MB of data for each data segment, each value can be doubled and added together, in this example, for the offset for the fifth data segment 1-3 332-3 (10 MB+100 MB+10 MB+100 MB for each of data segments 1-1, 2-1, 1-2, and 2-2 respectively). In this way, only the physical location of the first data segment in the L2P table is used to determine a physical location of a starting point of each of the data segments. Depending on the size of the total data being used, this single entry in the L2P table can correspond to a page level, a multiplane level, a superpage level, etc.

Figure 3B:
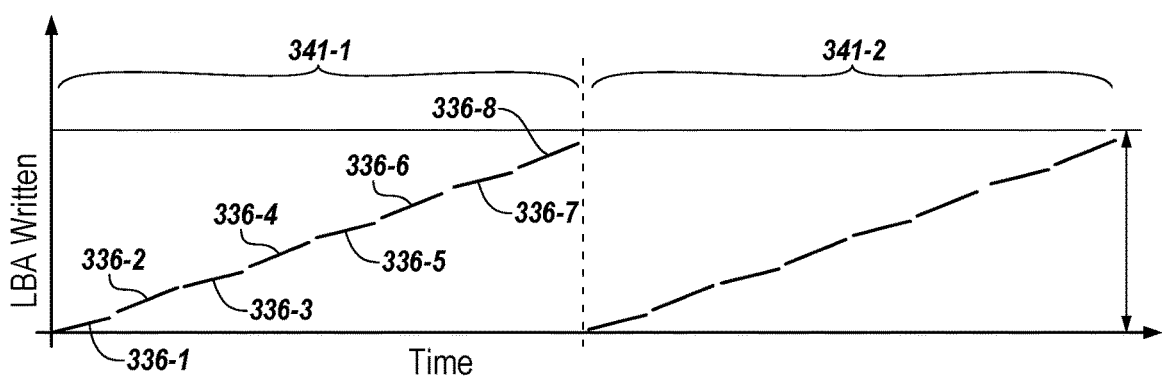
FIG. 3B illustrates an example diagram showing data associated with a particular sensor and written in a memory device in accordance with some embodiments of the present disclosure.

FIG. 3B illustrates an example diagram showing data associated with particular sensors being written in a memory device in accordance with some embodiments of the present disclosure. The diagram of FIG. 3B is associated with the data segments received in the description of FIG. 3A. As is illustrated in FIG. 3B, an x-axis of the diagram illustrates a period of time and the y-axis illustrates sequential LBAs written to. For example, a first data segment associated with LBA X 336-1 is received first in time, a second data segment associated with LBA X+1 336-2 is received second, a third data segment associated with LBA X+2 336-3 is received third, a fourth data segment associated with LBA X+3 336-4 is received fourth, and so forth through the eighth data segment associated with LBA X+7 336-7. In this way, the data segments received from both of the sensors, and also received in real-time, are logically sequential with respect to each other. This allows the ability to determine a physical location of each of the data segments based on a single entry in the L2P table using an offset corresponding to each LBA, as described.

In some embodiments, data received from the sensors and written to the LBA can be received during a first period of time 341-1. At the conclusion of writing to the LBA, the data that is subsequently received can be written to a beginning of LBA X 336-1, and the data previously written as LBA X 336-1 can be overwritten and/or previously erased. This can be repeated during time period 441-2 and for additional time periods until a message is received from a host to switch to a different location in the memory device or an error occurs. Each of these time periods can correspond to a snapshot of the memory device, further described in association with FIG. 6.

Figure 4:
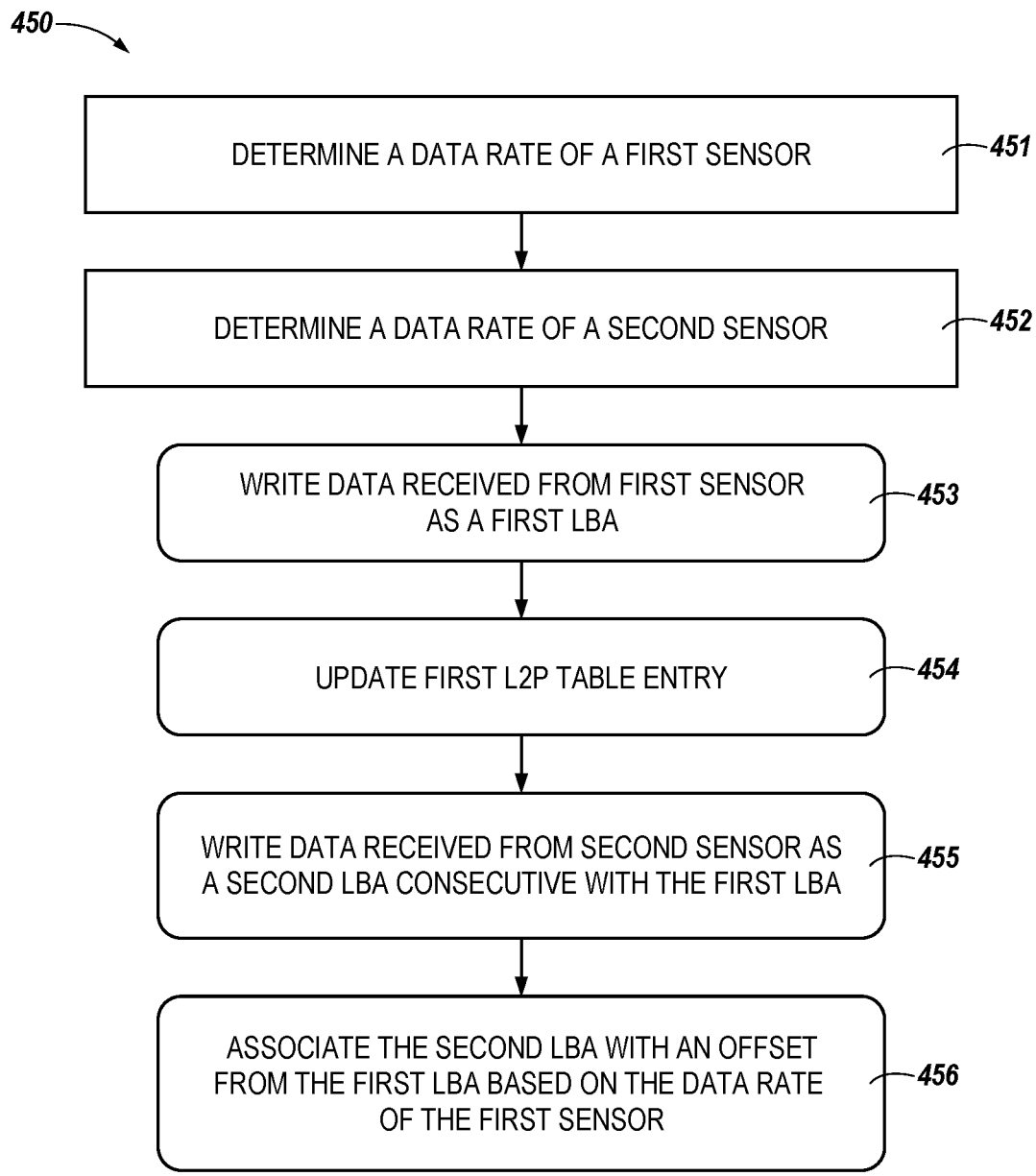
FIG. 4 illustrates a flow diagram corresponding to memory sub-system operations for logical block address remapping in accordance with some embodiments of the present disclosure.

FIG. 4 illustrates a flow diagram 450 corresponding to memory sub-system operations for LBA remapping in accordance with some embodiments of the present disclosure. At operation 451, the remap component can determine a data rate of a first sensor. The determined data rate can be based on a data rate sent from the first sensor, a rate determined based on previously sent data, etc. At operation 452, the remap component can determine a data rate of a second sensor. The determined data rate can be based on data rate sent from the first sensor, a data rate determined based on previously sent data, etc.

At operation 453, a memory sub-system controller can cause a first data segment received from the first sensor to be written as a first LBA. The first data segment written as the first LBA can be based on the indication from the remap component. At operation 454, an L2P table entry can be updated with the LBA location of the first data segment (e.g., the first entry of the first portion of the memory device). At operation 455, a memory sub-system controller can cause a second data segment received from the second sensor to be written as a second LBA. The second data segment written to can be based on the indication from the remap component. At 456, the second LBA can be associated with an offset from the first LBA based on the data rate of the first sensor.

The L2P table entry can indicate a starting location of the first data segment. For example, the first entry in the L2P table indicating a location of the first data segment can indicate a starting location of the first data segment in a portion of the memory device. The first data segment can be located later based on that starting location. Likewise, a subsequent second entry in the memory device associated with the first data segment from the second sensor can also be located based on that starting point of the first data segment. For example, a data size of the data segments sent from the first sensor can be a same data size. Therefore, the second data segment that is in the second entry of the first portion can be located as being one data size from the starting location of the first data segment. The data size distance from the starting location can then be determined and the particular data segment located for each of the data segments. By using a starting location and data size of each entry to locate a data segment, less data can be used to locate a data segment. Likewise, the data entries in an L2P table can be reduced and can allow for more memory to be used to write additional data. For example, a particular portion of data can be a group of data transferred or received to perform an operation, such as on a page level scale, a multi-plane level scale, or a superpage scale, and a single starting location entry can be associated with each page, each multi-plane, each superpage, etc. so that a quantity of each of the scales can correlate to a quantity of entries in an L2P table used for determining an offset. As an example, in the page level scale example, if 40 pages of data is received, 40 entries in an L2P table may indicate a starting location of a first data segment corresponding to each of the 40 pages.

Figure 5:
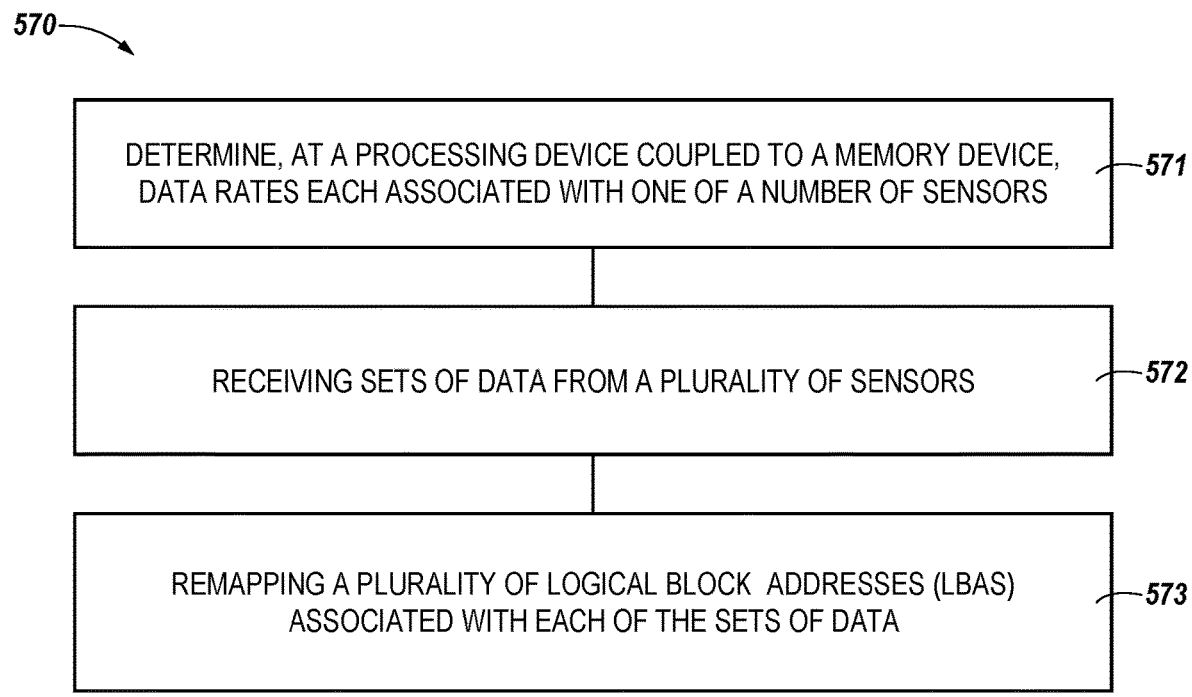
FIG. 5 is a flow diagram corresponding to a method for performing memory sub-system operations for logical block address remapping in accordance with some embodiments of the present disclosure.

FIG. 5 is a flow diagram corresponding to a method 570 for performing memory sub-system operations for logical block address remapping in accordance with some embodiments of the present disclosure. The method 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 570 is performed by the remap component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 571, data rates each associated with one of a plurality of sensors can be determined by a processing device coupled to a memory device (e.g., memory device 130 and/or 140 in FIG. 1). The memory device can be analogous to the memory device 130 and/or 140 of FIG. 1. In some embodiments, the data received from the plurality of sensors can be written logically sequential with respect to an order the data was received.

At operation 572, sets of data can be received from a plurality of sensors. In some embodiments, each of the plurality of sensors are a same type of sensor. In some embodiments, at least two of the plurality of sensors are a different type of sensor. At operation 573, a plurality of logical block addresses (LBAs) associated with each of the sets of data can be remapped. The plurality of LBAs that are remapped can be logically sequential LBAs. Each of the sets of data received subsequent to a first set of data can be associated with an offset from a starting point of an LBA in the memory device associated with the first set of data. The offsets can be based on a data rate of a sensor that sent data prior to reception of the set of data that the offset is being determined for some embodiments, the method can further include entering data in a logical to physical (L2P) table indicating a location in the L2P table where a beginning portion of the data received from the first sensor is written. In some embodiments, a first data rate of a first of the plurality of sensors is different than a second data rate of a second of the plurality of sensors. In some embodiments, the first data rate is faster than the second data rate.

In some embodiments, the method can further include writing a first of the sets of data as a first LBA and writing the sets of data associated with LBAs subsequent to the first LBA. In some embodiments, the method can further include reading the first set of data beginning at the starting point. In some embodiments, the method can further include reading each of the sets of data subsequent to the first set using a respective offset from the first set of data. The respective offsets can be associated with the respective data rates of the plurality of sensors. An entry associated with the first set of data can be entered into a logical to physical (L2P) table. In some embodiments, a logical to physical (L2P) table can be used to locate the sets of data.

Figure 6:
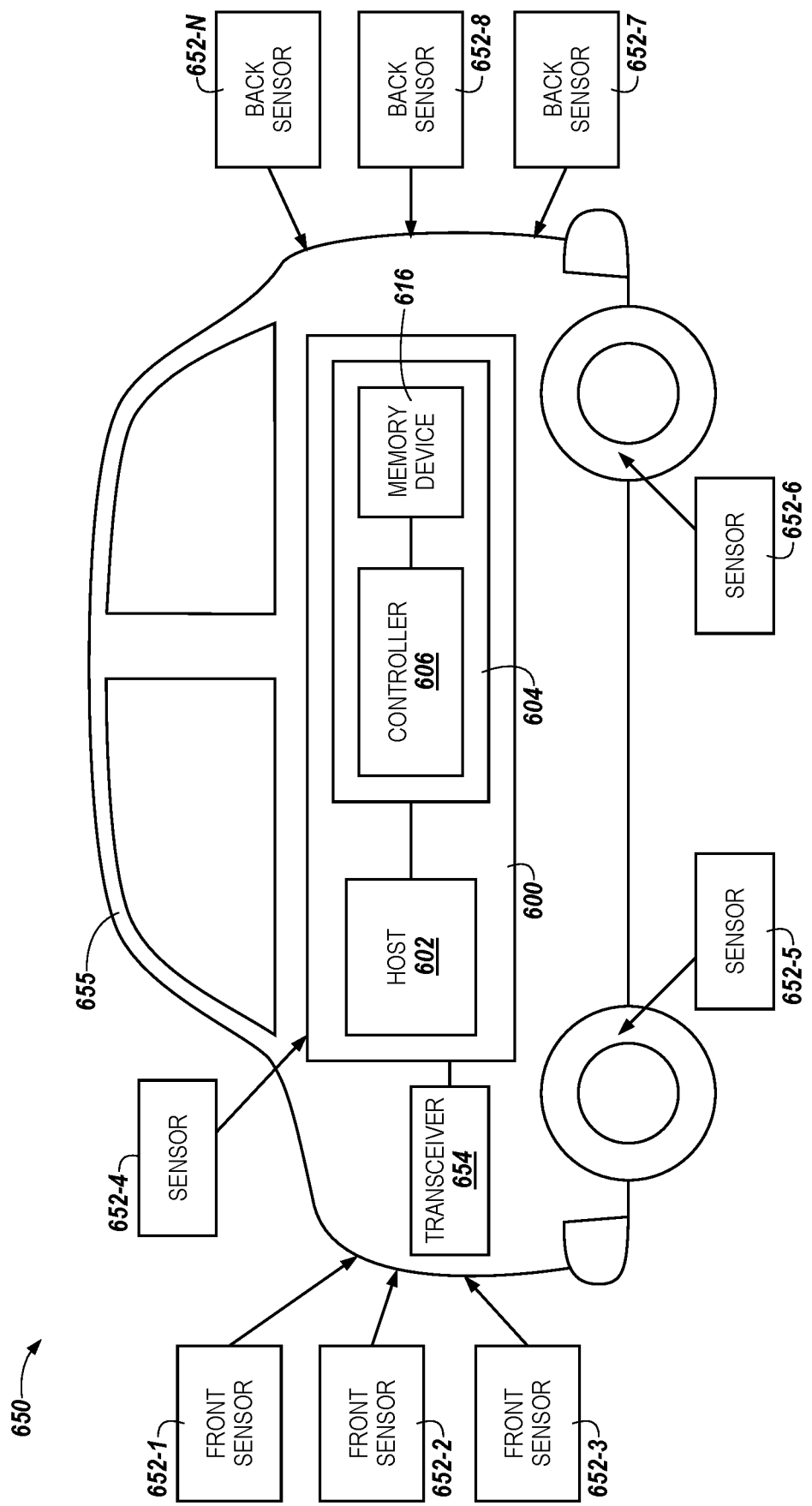
FIG. 6 illustrates an example of a system including a computing system in a vehicle in accordance with some embodiments of the present disclosure.

FIG. 6 illustrates an example of a system 650 including a computing system 600 in a vehicle 655 in accordance with some embodiments of the present disclosure. The computing system 600 can include a memory sub-system 604, which is illustrated as including a controller 606 and non-volatile memory device 616 for simplicity but is analogous to the memory sub-system 104 illustrated in FIG. 1. The computing system 600, and thus the host 602, can be coupled to a number of sensors 652 either directly, as illustrated for the sensor 652-4 or via a transceiver 652 as illustrated for the sensors 652-1, 652-2, 652-3, 652-5, 652-6, 652-5, 652-8, . . . , 652-N. The transceiver 652 is able to receive time based telemetric sensor data from the sensors 652 wirelessly, such as by radio frequency communication. In at least one embodiment, each of the sensors 652 can communicate with the computing system 600 wirelessly via the transceiver 652. In at least one embodiment, each of the sensors 652 is connected directly to the computing system 600 (e.g., via wires or optical cables). As used herein, telemetric sensor data means that the data is collected by sensors 652 that are remote from the memory sub-system 604 that stores the data (the receiving equipment). The telemetric sensor data is time based because the data is correlated with time. The time corresponding to each data point can either be stored with the telemetric data or derivable therefrom based on some metric, such as a known start time for the data and a data rate. The time can be useful in the playback of the sequences preceding an accident, for example.

The vehicle 655 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 652 are illustrated in FIG. 6 as including example attributes. For example, sensors 652-1, 652-2, and 652-3 are camera sensors collecting data from the front of the vehicle 655. Sensors 652-4, 652-5, and 652-6 are microphone sensors collecting data from the from the front, middle, and back of the vehicle 655. The sensors 652-7, 652-8, and 652-N are camera sensors collecting data from the back of the vehicle 655. As another example, the sensors 652-5, 652-6 are tire pressure sensors. As another example, the sensor 652-4 is a navigation sensor, such as a global positioning system (GPS) receiver. As another example, the sensor 652-6 is a speedometer. As another example, the sensor 652-4 represents a number of engine sensors such as a temperature sensor, a pressure sensor, a voltmeter, an ammeter, a tachometer, a fuel gauge, etc. As another example, the sensor 652-4 represents a video camera.

The host 602 can execute instructions to provide an overall control system and/or operating system for the vehicle 655. The host 602 can be a controller designed to assist in automation endeavors of the vehicle 655. For example, the host 602 can be an advanced driver assistance system controller (ADAS). An ADAS can monitor data to prevent accidents and provide warning of potentially unsafe situations. For example, the ADAS can monitor sensors in the vehicle 655 and take control of vehicle 655 operations to avoid accident or injury (e.g., to avoid accidents in the case of an incapacitated user of a vehicle). The host 602 could need to act and make decisions quickly to avoid accidents. The memory sub-system 604 can store reference data in the non-volatile memory device 616 such that time based telemetric sensor data from the sensors 652 can be compared to the reference data by the host 602 in order to make quick decisions.

The emergence of autonomous vehicles, Internet of Things (IoT) and surveillance devices has resulted in a wider gap in between the total bytes written (TBW) in a useable lifetime of a memory sub-system and a user capacity of the memory sub-system. For example, the TBW to user capacity ratio for some memory systems used for such applications has increased by one to three orders of magnitude. Some autonomous vehicles require real time buffering of telemetric data such as video cameras, radar, lidar, ultra-sonic and other sensors that are necessary to playback the sequences preceding an accident. The data from various sensors sums up to a substantial throughput requirement per unit time (e.g., 1 gigabyte per second (GB/sec) sequential write throughput from a host). Upon a trigger event, a quantity of data corresponding to a predetermined playback time immediately preceding the event needs to be captured (e.g., to determine the cause of an accident). The recorded telemetric sensor data corresponding to the predetermined playback time can be referred to as a "snapshot." An event recorder is one such application where the user capacity requirement could be as low as one hundred and twenty-eight (128) GB, but the TBW requirement could be as high as hundreds of Peta Bytes. The examples of values given are not limiting but highlight the relative difference between the requirements for capacity and TBW. An event recorder may need to store at least a few, most recent snapshots.

Figure 7:
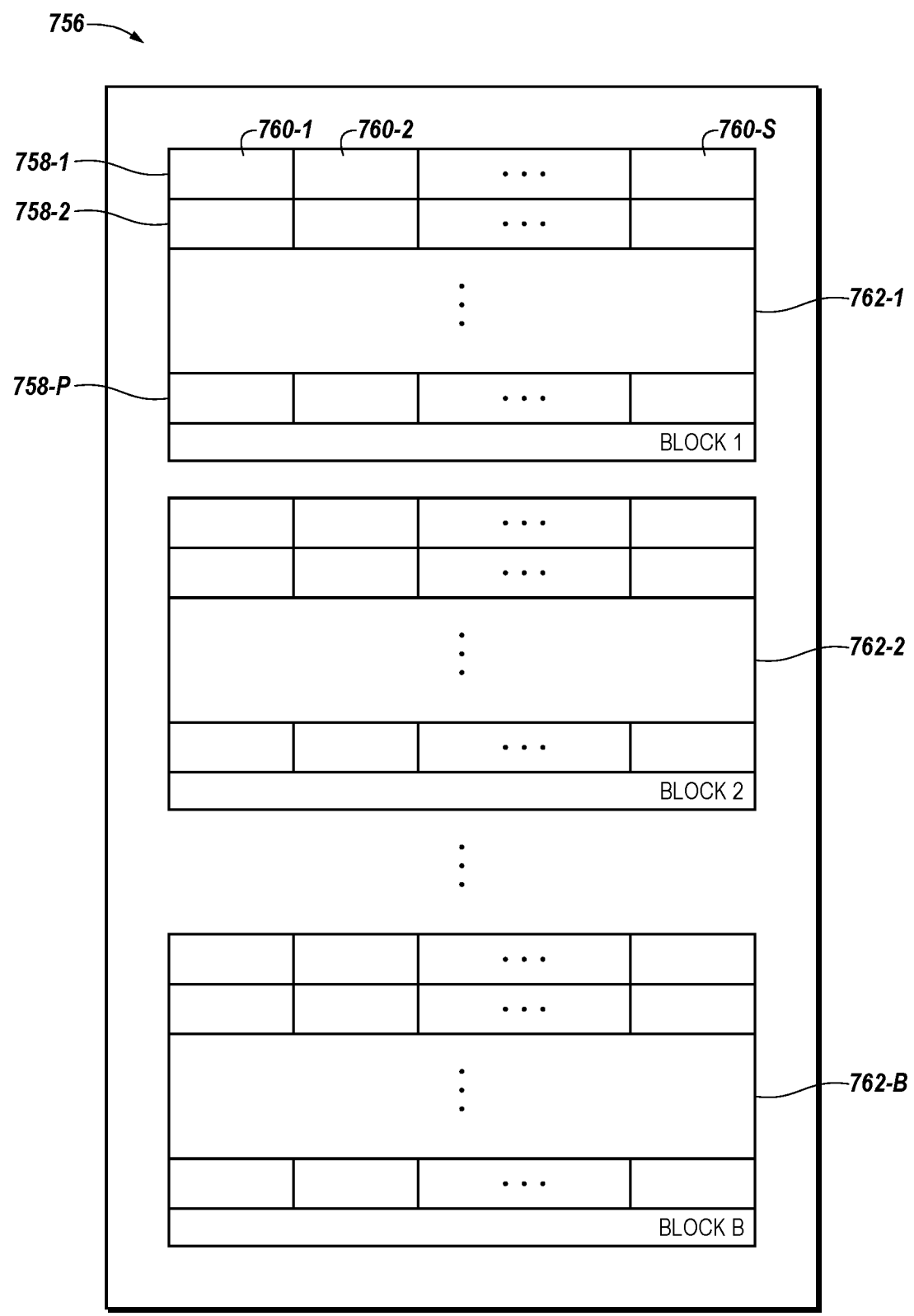
FIG. 7 illustrates a diagram of a portion of a memory array having physical blocks in accordance with some embodiments of the present disclosure.

FIG. 7 illustrates a diagram of a portion of a memory array having physical blocks in accordance with some embodiments of the present disclosure. The memory array 756 can represent a memory array of the non-volatile memory device 116 in FIG. 1, for example. The memory array 756 can be, for example, a NAND flash memory array. As an additional example, memory array 756 can be an SCM array, such as, for instance, a three-dimensional cross-point (3D Cross-point) memory array, a ferroelectric RAM (FRAM) array, or a resistance variable memory array such as a PCRAM, RRAM, or spin torque transfer (STT) array, among others. Further, although not shown in FIG. 7, memory array 756 can be located on a particular semiconductor die along with various peripheral circuitry associated with the operation thereof.

As shown in FIG. 7, the memory array 756 has a number of physical blocks 762-1 (BLOCK 1), 762-2 (BLOCK 2), . . . , 762-B (BLOCK B) of memory cells. The memory cells can be operated with various programming times and trims.

A number of physical blocks 762 of memory cells can be included in a plane of memory cells, and a number of planes of memory cells can be included on a die. For instance, in the example shown in FIG. 7, each physical block 762 can be part of a single die. The portion of the memory array 756 illustrated in FIG. 7 can be a die of memory cells and/or a logical unit.

As shown in FIG. 7, each physical block 762 includes a number of physical rows (e.g., rows 758-1, 758-2, . . . , 758-R) of memory cells coupled to access lines (e.g., word lines). Further, although not shown in FIG. 7, the memory cells can be coupled to sense lines (e.g., data lines and/or digit lines). As one of ordinary skill in the art will appreciate, each row 758 can include a number of pages of memory cells (e.g., physical pages). A physical page refers to a unit of programming and/or sensing (e.g., a number of memory cells that are programmed and/or sensed together as a functional group). In the embodiment shown in FIG. 7, each row 758 comprises one physical page of memory cells. However, embodiments of the present disclosure are not so limited. For instance, in an embodiment, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple logical pages of data (e.g., an upper page of data and a lower page of data, with each cell in a physical page storing one or more bits towards an upper page of data and one or more bits towards a lower page of data).

As shown in FIG. 7, a row 758 of memory cells can comprise a number of physical sectors 760-1, 760-2, . . . , 760-S (e.g., subsets of memory cells). Each physical sector 760 of cells can store a number of logical sectors of data. Additionally, each logical sector of data can correspond to a portion of a particular page of data. As an example, one logical sector of data stored in a particular physical sector can correspond to a logical sector corresponding to one page of data, and the other logical sector of data stored in the particular physical sector can correspond to the other page of data. Each physical sector 760, can store system data, user data, and/or overhead data, such as error correction code (ECC) data, LBA data, and metadata.

Figure 8:
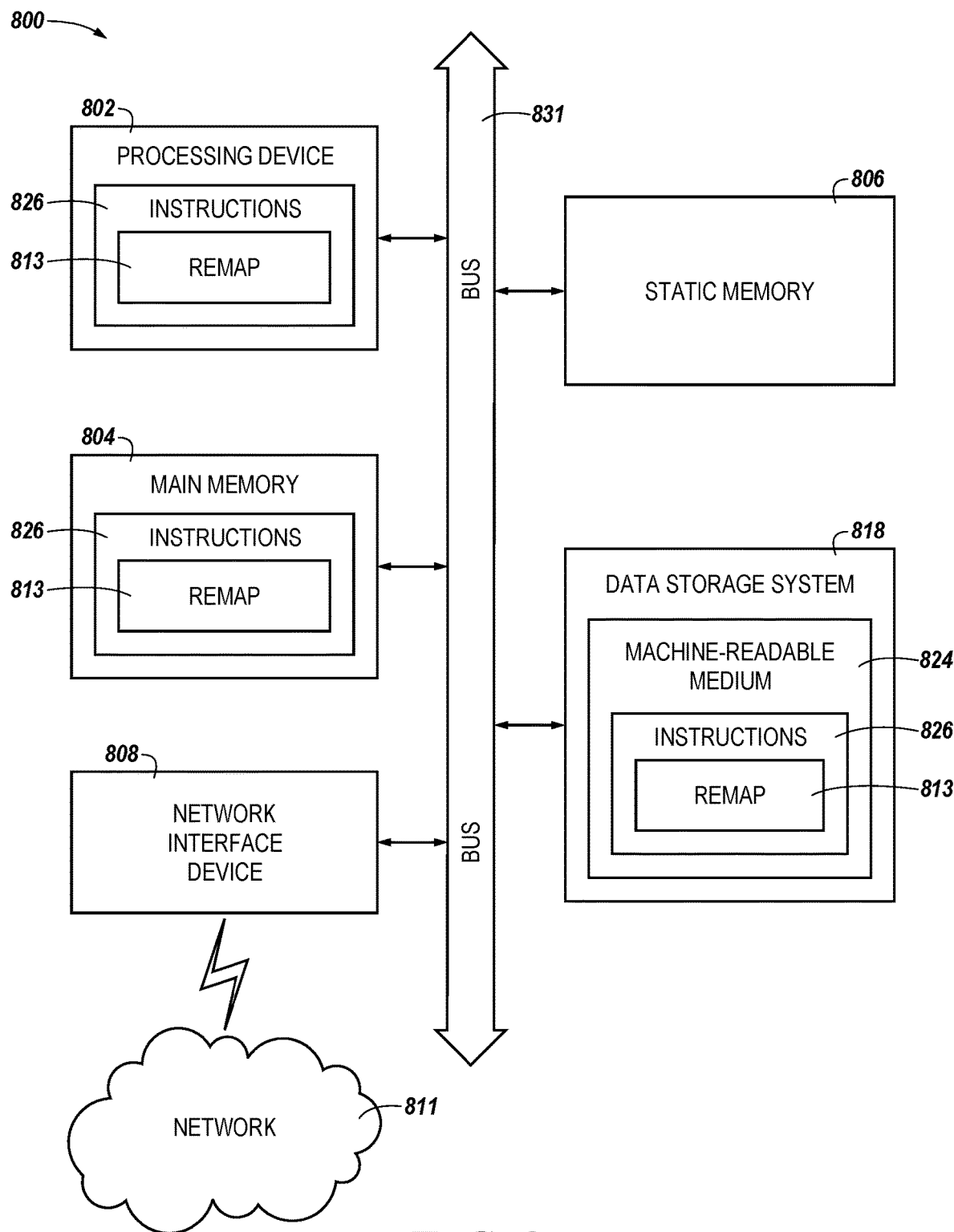
FIG. 8 is a block diagram of an example computer system in which embodiments of the present disclosure may operate.

FIG. 8 is a block diagram of an example computer system 800 in which embodiments of the present disclosure may operate. For example, FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the storage mode component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 831.

The processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 811.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a remap component (e.g., the remap component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including solid state drives (SSDs), hard disk drives (HDDs), floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
 a memory device; and
 a processing device coupled to the memory device, the processing device to perform operations comprising:
  determining a data rate from a first sensor and a data rate from a second sensor;
  writing:
   a first set of data received from the first sensor at a first logical block address (LBA) in the memory device; and
   a second set of data received from the second sensor subsequent to the first set of data at a second LBA in the memory device; and
   remapping the first LBA and the second LBA to be logically sequential LBAs;
   wherein the second LBA is associated with an offset from the first LBA and the offset corresponds to a data rate of the first sensor; and
  updating a logical to physical (L2P) table indicating a starting position of the first LBA without updating a starting position of the second LBA in the memory device.

2. The system of claim 1, wherein the processing device is to perform operations further comprising:
 receiving a third set of data subsequent to the second set of data from the first sensor; and
 writing a third set of data at a third LBA in the memory device, wherein the third LBA is logically sequential with the second LBA.

3. The system of claim 2, wherein the third LBA is associated with an additional offset from the first LBA and the additional offset is based on the data rates of the first sensor and the second sensor.

4. The system of claim 1, wherein the processing device is to perform operations further comprising writing a fourth set of data received from the second sensor at a fourth LBA in the memory device, wherein the fourth LBA is logically sequential with the third LBA.

5. The system of claim 4, wherein the fourth LBA is associated with a second additional offset from the first LBA and the second additional offset is based on the data rates of the first sensor and the second sensor.

6. A method, comprising:
 determining, at a processing device coupled to a memory device, a data rate associated with each of a plurality of sensors;
 receiving sets of data from a plurality of sensors;
 remapping a plurality of logical block addresses (LBAs) associated with each of the sets of data, wherein;
  the plurality of LBAs are logically sequential; and
  each of the sets of data subsequent to a first set of data from a first of the plurality of sensors is associated with an offset from a starting point of an LBA in the memory device associated with the first set of data; and
  each of the sets of data subsequent to the first set of data are associated with an offset that is based on the data rates of the first sensor and the second sensor.

7. The method of claim 6, further comprising:
 writing the first set of data as a first LBA; and
 writing the sets of data associated with LBAs subsequent to the first LBA.

8. The method of claim 6, further comprising reading the first set of data beginning at the starting point.

9. The method of claim 6, further comprising reading each of the sets of data subsequent to the first set using a respective offset from the first set of data.

10. The method of claim 9, wherein the respective offsets are associated with the respective data rates of the plurality of sensors.

11. The method of claim 6, wherein an entry associated with the first set of data is entered into a logical to physical (L2P) table.

12. The method of claim 6, wherein a logical to physical (L2P) table used to locate the sets of data does not include entries associated with each of the sets of data subsequent to the first set of data.

13. The method of claim 6, wherein at least one of the data rates is greater than a second of the data rates.

14. An apparatus, comprising:
 a memory device comprising an array of memory cells;
 a processing device coupled to the memory device, the processing device to perform operations comprising:
  receiving a first set of data from a first sensor associated with a first data rate;
  writing the first set of data in the array, wherein the first set of data is associated with a first logical block address (LBA);
  receiving a second set of data from a second sensor associated with a second data rate and directly after receiving the first set;
  writing the second set of data in the array, wherein:
   the second set of data is associated with a second LBA that is logically contiguous with the first LBA;
   the second set of data is associated with an offset based on the data rate of the first sensor;
  receiving a third set of data from the first sensor at the first data rate subsequent to receiving the second set; and
  writing:
   the third set of data to the array, wherein the third set of data is associated with a third LBA that is logically contiguous with the second LBA; and
   the third set of data is associated with an offset based on the data rates of the first sensor and the second sensor.

15. The apparatus of claim 14, wherein the processing device is to further perform operations comprising:
 receiving a fourth set of data from the second sensor at the second data rate and after receiving the third set;
 writing the fourth set of data to the array;
 wherein:
  the fourth set of data is associated with a fourth LBA that is logically contiguous with the third LBA; and
  the fourth set of data is associated with an offset based on the data rates of the first sensor and the second sensor.

16. The apparatus of claim 15, wherein a data width from a beginning of the first data set to an ending of the second data set is equal to a data width from a beginning of the third data set to an ending of the fourth data set.

17. The apparatus of claim 14, wherein the first set and the second set written to the memory device are different size data sets.

18. The apparatus of claim 14, wherein:
 the memory device is configured to store a logical to physical (L2P) mapping table; and
 a number of entries in the L2P mapping table is independent of a number of data sets received from the plurality of sensors.

19. The apparatus of claim 14, wherein:
the memory device is configured to store a logical to physical (L2P) mapping table; and
a single entry in the L2P mapping table corresponds to an amount of data associated with one of:
 a page level;
 a multiplane level; and
 a superpage level.

20. A system, comprising:
a memory device; and
a processing device coupled to the memory device, the processing device to perform operations comprising:
 determining a data rate from a first sensor and a data rate from a second sensor;
 writing:
  a first set of data received from the first sensor at a first logical block address (LBA) in the memory device; and
  a second set of data received from the second sensor subsequent to the first set of data at a second LBA in the memory device; and
  remapping the first LBA and the second LBA to be logically sequential LBAs;
  wherein the second LBA is associated with an offset from the first LBA and the offset corresponds to a data rate of the first sensor;
 receiving a third set of data subsequent to the second set of data from the first sensor; and
 writing a third set of data at a third LBA in the memory device, wherein the third LBA is logically sequential with the second LBA;
 wherein the third LBA is associated with an additional offset from the first LBA and the additional offset is based on the data rates of the first sensor and the second sensor.

21. A system, comprising:
a memory device; and
a processing device coupled to the memory device, the processing device to perform operations comprising:
 determining a data rate from a first sensor and a data rate from a second sensor;
 writing:
  a first set of data received from the first sensor at a first logical block address (LBA) in the memory device; and
  a second set of data received from the second sensor subsequent to the first set of data at a second LBA in the memory device; and
  remapping the first LBA and the second LBA to be logically sequential LBAs;
  wherein the second LBA is associated with an offset from the first LBA and the offset corresponds to a data rate of the first sensor; and
 writing a fourth set of data received from the second sensor at a fourth LBA in the memory device, wherein the fourth LBA is logically sequential with the third LBA;
 wherein the fourth LBA is associated with a second additional offset from the first LBA and the second additional offset is based on the data rates of the first sensor and the second sensor.

* * * * *